United States Patent
Xie (10) Patent No.: US 10,452,149 B2
(45) Date of Patent: Oct. 22, 2019

(54) METHOD FOR GRADING SPATIAL PAINTING, APPARATUS AND SYSTEM FOR GRADING SPATIAL PAINTING

(71) Applicant: Wistron Corporation, New Taipei (TW)

(72) Inventor: Yi-Zhan Xie, New Taipei (TW)

(73) Assignee: Wistron Corporation, New Taipei (TW)

( * ) Notice: Subject to any disclaimer, the term of this patent is extended or adjusted under 35 U.S.C. 154(b) by 557 days.

(21) Appl. No.: 15/168,260

(22) Filed: May 31, 2016

(65) Prior Publication Data

US 2017/0243060 A1   Aug. 24, 2017

(30) Foreign Application Priority Data

Feb. 18, 2016   (CN) .......................... 2016 1 0091986

(51) Int. Cl.
| | |
|---|---|
| *G06F 3/01* | (2006.01) |
| *G06F 3/14* | (2006.01) |
| *G06K 9/00* | (2006.01) |
| *G06K 9/62* | (2006.01) |
| *G06F 1/16* | (2006.01) |

(52) U.S. Cl.
CPC .............. *G06F 3/017* (2013.01); *G06F 1/163* (2013.01); *G06F 3/1415* (2013.01); *G06K 9/00335* (2013.01); *G06K 9/6215* (2013.01)

(58) Field of Classification Search
CPC ........ G06F 1/163; G06F 3/017; G06F 3/0346; G06F 3/1415; G06K 9/00335; G06K 9/00342; G06K 9/6214; G06T 11/203
See application file for complete search history.

(56) References Cited

U.S. PATENT DOCUMENTS

| | | | | |
|---|---|---|---|---|
| 6,634,949 B1 * | 10/2003 | Briggs | ................... | A63F 13/12 |
| | | | | 273/440 |
| 6,746,247 B2 * | 6/2004 | Barton | ................... | A63B 69/00 |
| | | | | 434/247 |
| 6,898,550 B1 * | 5/2005 | Blackadar | ............ | A43B 3/0005 |
| | | | | 702/182 |

(Continued)

FOREIGN PATENT DOCUMENTS

| | | |
|---|---|---|
| CN | 101268434 | 6/2010 |
| CN | 104990551 | 10/2015 |

OTHER PUBLICATIONS

"Office Action of Taiwan Counterpart Application", dated Dec. 1, 2016, p. 1-p. 10, in which the listed references were cited.

(Continued)

*Primary Examiner* — Amare Mengistu
*Assistant Examiner* — Crystal Mathews
(74) *Attorney, Agent, or Firm* — JCIPRNET (57) ABSTRACT

A method for grading spatial painting, apparatus and system for grading spatial painting are proposed. The method includes: generating a first spatial pattern; recording a moving trace and a plurality of moving parameters of an electronic apparatus and transforming the recorded moving trace into a second spatial pattern; calculating a similarity between the first and the second spatial pattern; and calculating a grade for completing the second spatial pattern according to the moving parameters and the similarity.

21 Claims, 6 Drawing Sheets

(56) References Cited

U.S. PATENT DOCUMENTS

| | | | |
|---|---|---|---|
| 6,981,876 B2* | 1/2006 | Bleckley | A63B 24/0003 434/247 |
| 7,572,205 B1* | 8/2009 | Cribar | A63B 24/0062 482/3 |
| 8,162,804 B2 | 4/2012 | Tagliabue | |
| 8,616,989 B2* | 12/2013 | Bentley | A61B 5/1122 473/215 |
| 8,979,665 B1* | 3/2015 | Najafi | G09B 19/0038 473/269 |
| 9,154,739 B1* | 10/2015 | Nicolaou | H04N 7/18 |
| 9,161,708 B2* | 10/2015 | Elliott | A63B 71/06 |
| 9,350,951 B1* | 5/2016 | Rowe | H04N 5/2621 |
| 9,449,230 B2* | 9/2016 | Han | G06K 9/00355 |
| 2002/0111541 A1* | 8/2002 | Bibl | A61B 5/0002 600/300 |
| 2003/0227453 A1* | 12/2003 | Beier | A63B 24/0003 345/419 |
| 2004/0248071 A1* | 12/2004 | Bedziouk | A63B 24/00 434/247 |
| 2005/0179202 A1* | 8/2005 | French | A63B 24/0003 273/247 |
| 2005/0209050 A1* | 9/2005 | Bartels | A63B 24/0084 482/8 |
| 2006/0003300 A1* | 1/2006 | Davis | A63B 24/0003 434/247 |
| 2007/0026958 A1* | 2/2007 | Barasch | A63B 24/0003 473/266 |
| 2007/0041058 A1* | 2/2007 | Disatnik | G06F 3/0317 358/486 |
| 2007/0041616 A1* | 2/2007 | Lee | G06F 3/0317 382/107 |
| 2007/0050715 A1* | 3/2007 | Behar | A61B 5/0002 715/706 |
| 2007/0067745 A1* | 3/2007 | Choi | G06F 3/0317 715/863 |
| 2007/0239479 A1* | 10/2007 | Arrasvuori | G06Q 10/10 705/2 |
| 2007/0260421 A1* | 11/2007 | Berner, Jr. | A43B 3/0005 702/160 |
| 2007/0287596 A1* | 12/2007 | Case, Jr. | A63B 24/00 482/8 |
| 2010/0073284 A1* | 3/2010 | Dods | G06F 3/017 345/156 |
| 2010/0300269 A1* | 12/2010 | Applewhite | G10H 1/0058 84/610 |
| 2011/0291988 A1* | 12/2011 | Bamji | G06F 3/0428 345/175 |
| 2011/0306398 A1* | 12/2011 | Boch | G06F 3/011 463/7 |
| 2012/0038549 A1* | 2/2012 | Mandella | G06F 3/011 345/156 |
| 2012/0038652 A1* | 2/2012 | Yang | G06F 1/1694 345/467 |
| 2012/0052942 A1* | 3/2012 | Esaki | G06F 3/017 463/31 |
| 2012/0108305 A1* | 5/2012 | Akiyama | A63F 13/44 463/7 |
| 2012/0133655 A1* | 5/2012 | Kristjansson | A61B 5/1124 345/419 |
| 2012/0143358 A1* | 6/2012 | Adams | G06F 3/011 700/92 |
| 2012/0183939 A1* | 7/2012 | Aragones | A63B 24/0006 434/247 |
| 2013/0267335 A1* | 10/2013 | Boyd | A63B 69/36 473/222 |
| 2013/0296048 A1* | 11/2013 | Jeffery | A63F 13/12 463/31 |
| 2014/0018181 A1* | 1/2014 | Blake | A63B 24/0006 473/277 |
| 2015/0095882 A1* | 4/2015 | Jaeger | G06F 8/34 717/109 |
| 2016/0086322 A1* | 3/2016 | Arita | E01B 35/02 382/154 |
| 2016/0086500 A1* | 3/2016 | Kaleal, III | G06T 19/00 434/257 |
| 2016/0203362 A1* | 7/2016 | Huang | G06F 3/017 726/19 |
| 2016/0216770 A1* | 7/2016 | Jang | G06F 3/017 |
| 2016/0364010 A1* | 12/2016 | Amma | G06K 9/00355 |
| 2017/0215164 A1* | 7/2017 | Disatnik | H04W 64/006 |
| 2017/0220104 A1* | 8/2017 | Goslin | G06F 3/011 |
| 2017/0269586 A1* | 9/2017 | D'Andrea | A63H 30/04 |
| 2018/0011973 A1* | 1/2018 | Fish | G06F 21/35 |

OTHER PUBLICATIONS

"Office Action of China Counterpart Application," dated Apr. 10, 2019, p. 1-p. 7.

* cited by examiner

| Exercise modes | G | Speed grade | VA | k2 | Distance grade | S | k1 | Similarity grade | Sim | k3 | Complexity grade | X | H | k4 |
|---|---|---|---|---|---|---|---|---|---|---|---|---|---|---|
| Best result in 100m running | 204.7446384 | 103.7446 | 37580 | 0.55 | 10 | 100 | 1 | 40 | 0.4 | 100 | 51 | 1 | 0.02 | 50 |
| Best result in 200m running | 204.6425347 | 103.6425 | 37510 | 0.55 | 10 | 100 | 1 | 40 | 0.4 | 100 | 51 | 1 | 0.02 | 50 |
| Best result in 400m running | 208.5843225 | 97.58432 | 33480 | 0.55 | 20 | 400 | 1 | 40 | 0.4 | 100 | 51 | 1 | 0.02 | 50 |
| Best result in 800m running | 208.8177845 | 89.53351 | 28500 | 0.55 | 28.28427 | 800 | 1 | 40 | 0.4 | 100 | 51 | 1 | 0.02 | 50 |
| Best result in 1.5km running | 210.9363603 | 81.20653 | 23800 | 0.55 | 38.72983 | 1500 | 1 | 40 | 0.4 | 100 | 51 | 1 | 0.02 | 50 |
| Best result in 3km running | 228.2355809 | 82.46333 | 24480 | 0.55 | 54.77226 | 3000 | 1 | 40 | 0.4 | 100 | 51 | 1 | 0.02 | 50 |
| Best result in 5km running | 242.9172049 | 81.20653 | 23800 | 0.55 | 70.71068 | 5000 | 1 | 40 | 0.4 | 100 | 51 | 1 | 0.02 | 50 |
| Best result in 10km running | 270.3221281 | 79.32213 | 22800 | 0.55 | 100 | 10000 | 1 | 40 | 0.4 | 100 | 51 | 1 | 0.02 | 50 |
| Best result in Marathon running | 367.0201644 | 70.60595 | 18480 | 0.55 | 205.4142 | 42195 | 1 | 40 | 0.4 | 100 | 51 | 1 | 0.02 | 50 |
| Ordinary people in 100m running | 195.5163576 | 90.37422 | 29000 | 0.55 | 14.14214 | 200 | 1 | 40 | 0.4 | 100 | 51 | 1 | 0.02 | 50 |
| Ordinary people in 200m running | 193.2966874 | 88.15455 | 27690 | 0.55 | 14.14214 | 200 | 1 | 40 | 0.4 | 100 | 51 | 1 | 0.02 | 50 |
| Ordinary people in 400m running | 192.5781834 | 81.57818 | 24000 | 0.55 | 20 | 400 | 1 | 40 | 0.4 | 100 | 51 | 1 | 0.02 | 50 |
| Ordinary people in 800m running | 190.9954977 | 71.71123 | 19000 | 0.55 | 28.28427 | 800 | 1 | 40 | 0.4 | 100 | 51 | 1 | 0.02 | 50 |
| Ordinary people in 1.5km running | 197.0908014 | 67.36097 | 17000 | 0.55 | 38.72983 | 1500 | 1 | 40 | 0.4 | 100 | 51 | 1 | 0.02 | 50 |
| Ordinary people in 3km running | 208.4819041 | 62.70965 | 15000 | 0.55 | 54.77226 | 3000 | 1 | 40 | 0.4 | 100 | 51 | 1 | 0.02 | 50 |
| Ordinary people in 5km running | 221.9601594 | 60.24948 | 14000 | 0.55 | 70.71068 | 5000 | 1 | 40 | 0.4 | 100 | 51 | 1 | 0.02 | 50 |
| Ordinary people in 10km running | 248.6844866 | 57.68449 | 13000 | 0.55 | 100 | 10000 | 1 | 40 | 0.4 | 100 | 51 | 1 | 0.02 | 50 |
| Ordinary people in Marathon running | 348.5917971 | 52.17758 | 11000 | 0.55 | 205.4142 | 42195 | 1 | 40 | 0.4 | 100 | 51 | 1 | 0.02 | 50 |
| 2km walking | 135.7213595 | 0 | 2000 | 0.55 | 44.72136 | 2000 | 1 | 40 | 0.4 | 100 | 51 | 1 | 0.02 | 50 |
| 4km fast walking | 184.3702939 | 30.12474 | 5000 | 0.55 | 63.24555 | 4000 | 1 | 40 | 0.4 | 100 | 51 | 1 | 0.02 | 50 |
| Spatial difficulty 1 | 191.1247407 | 30.12474 | 5000 | 0.55 | 1 | 1 | 1 | 60 | 0.6 | 100 | 100 | 1 | 1 | 50 |
| Spatial difficulty 2 | 262.3608086 | 30.12474 | 5000 | 0.55 | 2.236068 | 5 | 1 | 80 | 0.8 | 100 | 150 | 2 | 1 | 50 |
| Spatial difficulty 3 | 312.3608086 | 30.12474 | 5000 | 0.55 | 2.236068 | 5 | 1 | 80 | 0.8 | 100 | 200 | 3 | 1 | 50 |
| Spatial difficulty 4 | 362.3608086 | 30.12474 | 5000 | 0.55 | 2.236068 | 5 | 1 | 80 | 0.8 | 100 | 250 | 4 | 1 | 50 |

| Grading parameter | Grade value range | Parameter calculation formula |
|---|---|---|
| Speed grade | 0~113 | $(VA-2000)^{1/2} * k2$ |
| Distance grade | 10~200 | $S^{(1/2)} * k1$ |
| Similarity grade | 0~100 | $Sim * k3$ |
| Complexity grade | 100~200 | $(X+H) * k4$ |

METHOD FOR GRADING SPATIAL PAINTING, APPARATUS AND SYSTEM FOR GRADING SPATIAL PAINTING

CROSS-REFERENCE TO RELATED APPLICATION

This application claims the priority benefit of China application serial no. 201610091986.7, filed on Feb. 18, 2016. The entirety of the above-mentioned patent application is hereby incorporated by reference herein and made a part of this specification.

BACKGROUND OF THE INVENTION

1. Field of the Invention

The invention relates to a method for grading spatial painting, and apparatus and system for grading spatial painting.

2. Description of Related Art

The so-call "smart phone addicts" refer to people who lack of exercise or social life due to their addiction on the cell phone with increasingly more powerful functions. However, in spite of the growing awareness and pursuit for better health, most of people still have insufficient motivation for exercise. Most of the existing exercise applications attempts to increase users' interest and motivation for exercise by the features of sharing the activities to social network such as WeChat or Weibo. However, besides the sharing feature, the most important feature for this kind of application is still the effectiveness of exercising. Yet, it is bored and lack of variability if exercise involves simply trainings like running, push up and so on.

Therefore, if an application is developed to satisfy the addiction on the smart phone while allowing the user to conduct exercise, weight loss, training of intelligence and sharing the results to the social network for interaction with the friends, there can be more people joining the group of work out to prevent sub-health and diseases from easily happening upon us. As such, we might find ourselves a place at the pure land in this materialistic society.

SUMMARY OF THE INVENTION

Accordingly, the invention is directed a method for grading spatial painting, and apparatus and system for grading spatial painting. The invention allows the user to use an electronic apparatus (e.g., a smart apparatus or a wearable apparatus) as a point for drawing a second spatial pattern in the space according to a given first spatial pattern and grading by comparing the first and the second spatial patterns. As a result, the invention may utilize novelty of spatial painting to help the user in participating exercise at any time, so as to enhance physical fitness of the user while reducing the time spent on playing with the cell phone. Further, the invention also allows people to train the imagination for the spatial pattern while using the electronic apparatus to draw the second spatial pattern.

The invention provides a method for grading spatial painting, which is adapted to an electronic apparatus and includes: generating a first spatial pattern; recording a moving trace and a plurality of moving parameters of the electronic apparatus and transforming the recorded moving trace into a second spatial pattern; calculating a similarity between the first spatial pattern and the second spatial pattern; and calculating a grade for completing the second spatial pattern according to the moving parameters and the similarity.

In an embodiment of the invention, the moving parameters include a total moving distance and an average speed, and the step of recording the moving trace and the moving parameters of the electronic apparatus and transforming the recorded moving trace into the second spatial pattern includes: starting recording a plurality of coordinates of the electronic apparatus based on a sampling period in response to a start operation, wherein the coordinates form the moving trace; stopping recording the coordinates of the electronic apparatus in response to a stop operation; calculating the total moving distance moved by the electronic apparatus during a period from the start operation to the stop operation according to the coordinates and calculating the average speed of the electronic apparatus during the period according to the total moving distance; and connecting the coordinates to generate the second spatial pattern.

In an embodiment of the invention, the step of calculating the similarity between the first spatial pattern and the second spatial pattern includes: scaling the first spatial pattern into a third spatial pattern and mapping the third spatial pattern to a two-dimensional space; mapping the second spatial pattern to the two-dimensional space and aligning the second spatial pattern and the third spatial pattern in the two-dimensional space; creating a plurality of reference lines in the two-dimensional space; locating a plurality of first reference points on the reference lines intersecting the second spatial pattern and locating a plurality of second reference points on the reference lines intersecting the third spatial pattern; respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer; calculating a distance between a j-th first reference point and a j-th second reference point, wherein j is an integer not greater than a third number, and the third number is a smaller one among the first number and the second number; and calculating the similarity according to the distance and an area of the third spatial pattern.

In an embodiment of the invention, the step of scaling the first spatial pattern into the third spatial pattern and mapping the third spatial pattern to the two-dimensional space includes: calculating a ratio between a first area of the first spatial pattern and a second area of the second spatial pattern, wherein the ratio is greater than 1; scaling up the first spatial pattern into the third spatial pattern according to the ratio; mapping the third spatial pattern to the two-dimensional space and setting a center of mass of the third spatial pattern as an origin point of the two-dimensional space. The step of mapping the second spatial pattern to the two-dimensional space and aligning the second spatial pattern and the third spatial pattern in the two-dimensional space includes: mapping the second spatial pattern to the two-dimensional space and moving the second spatial pattern so a center of mass thereof is located at the origin point; and rotating the second spatial pattern to maximize so an overlapping area between the second spatial pattern and the third spatial pattern.

In an embodiment of the invention, before the step of calculating the grade for completing the second spatial pattern according to the moving parameters and the similarity, the method further includes: calculating a complexity for completing the second spatial pattern according to the moving parameters of the electronic apparatus and a difficulty of the first spatial pattern.

In an embodiment of the invention, the first spatial pattern is a two-dimensional pattern having at least one vertex and at least one region. The moving parameters include a height difference and a total moving distance experienced by the electronic apparatus when drawing the second spatial pattern, and the step of calculating the complexity for completing the second spatial pattern according to the moving parameters of the electronic apparatus and the difficulty of the first spatial pattern includes: calculating a height difference grade based on the height difference and the total moving distance; calculating a number of steps for connecting the at least one vertex in one single stroke based on a number of the at least one vertex and a number of the at least one region and deducing the difficulty of the first spatial pattern according to the number of step; and calculating the complexity by summing the height difference grade and the difficulty.

In an embodiment of the invention, after the step of calculating the grade for completing the second spatial pattern according to the moving parameters and the similarity, the method further includes: correcting the grade by adding the complexity multiplied by a weight to the grade.

In an embodiment of the invention, the moving parameters include a total moving distance and an average speed, and the step calculating the grade for completing the second spatial pattern according to the moving parameters and the similarity includes: calculating the grade by summing the total moving distance multiplied by a first weight, the average speed multiplied by a second weight and the similarity multiplied by a third weight.

The invention provides an electronic apparatus for grading spatial painting, which includes a storage circuit and a processor. The storage circuit stores a plurality of modules. The processor is coupled to the storage circuit and configured to access and execute the modules. The modules include a generating module, a recording module and a calculating module. The generating module generates a first spatial pattern. The recording module records a moving trace and a plurality of moving parameters of an electronic apparatus and transforms the recorded moving trace into a second spatial pattern. The calculating module calculates a similarity between the first spatial pattern and the second spatial pattern and calculates a grade for completing the second spatial pattern according to the moving parameters and the similarity.

In an embodiment of the invention, the moving parameters include a total moving distance and an average speed, and the recording module is configured for: starting recording a plurality of coordinates of the electronic apparatus based on a sampling period in response to a start operation, wherein the coordinates form the moving trace; stopping recording the coordinates of the electronic apparatus in response to a stop operation; calculating the total moving distance moved by the electronic apparatus during a period from the start operation to the stop operation according to the coordinates and calculating the average speed of the electronic apparatus during the period according to the total moving distance; and connecting the coordinates to generate the second spatial pattern.

In an embodiment of the invention, the calculating module is configured for: scaling the first spatial pattern into a third spatial pattern and mapping the third spatial pattern to a two-dimensional space; mapping the second spatial pattern to the two-dimensional space and aligning the second spatial pattern and the third spatial pattern in the two-dimensional space; creating a plurality of reference lines in the two-dimensional space; locating a plurality of first reference points on the reference lines intersecting the second spatial pattern and locating a plurality of second reference points on the reference lines intersecting the third spatial pattern; respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer; calculating a distance between a j-th first reference point and a j-th second reference point, wherein j is an integer not greater than a third number, and the third number is a smaller one among the first number and the second number; and calculating the similarity according to the distance and an area of the third spatial pattern.

In an embodiment of the invention, the calculating module is configured for: calculating a ratio between a first area of the first spatial pattern and a second area of the second spatial pattern, wherein the ratio is greater than 1; scaling up the first spatial pattern into the third spatial pattern according to the ratio; mapping the third spatial pattern to the two-dimensional space and setting a center of mass of the third spatial pattern as an origin point of the two-dimensional space; mapping the second spatial pattern to the two-dimensional space and moving the second spatial pattern so a center of mass thereof is located at the origin point; and rotating the second spatial pattern to maximize an overlapping area between the second spatial pattern and the third spatial pattern.

In an embodiment of the invention, the calculating module is further configured for: calculating a complexity for completing the second spatial pattern according to the moving parameters of the electronic apparatus and a difficulty of the first spatial pattern.

In an embodiment of the invention, the first spatial pattern is a two-dimensional pattern having at least one vertex and at least one region. The moving parameters include a height difference and a total moving distance experienced by the electronic apparatus when drawing the second spatial pattern, and the calculating module is configured for: calculating a height difference grade based on the height difference and the total moving distance; calculating a number of steps for connecting the at least one vertex in one single stroke based on a number of the at least one vertex and a number of the at least one region and deducing the difficulty of the first spatial pattern according to the number of steps; and calculating the complexity by summing the height difference grade and the difficulty.

In an embodiment of the invention, the calculating module is further configured for: correcting the grade by adding the complexity multiplied by a weight to the grade.

In an embodiment of the invention, the moving parameters include a total moving distance and an average speed, and the calculating module is configured for: calculating the grade by summing the total moving distance multiplied by a first weight, the average speed multiplied by a second weight and the similarity multiplied by a third weight.

The invention provides a system for grading spatial painting, which includes a smart apparatus and a wearable apparatus. The smart apparatus generates a first spatial pattern. The wearable apparatus is connected to the smart apparatus and configured to record a moving trace and a plurality of moving parameters of the wearable apparatus and transmit the moving trace and the moving parameters back to the smart apparatus. The smart apparatus transforms the moving trace recorded by the wearable apparatus into a second spatial pattern, calculates a similarity between the first spatial pattern and the second spatial pattern, and calculates a grade for completing the second spatial pattern according to the moving parameters and the similarity.

In an embodiment of the invention, the moving parameters include a total moving distance and an average speed, and the wearable apparatus is configured for: starting recording a plurality of coordinates based on a sampling period in response to a start operation, wherein the coordinates form the moving trace; stopping recording the coordinates of the wearable apparatus in response to a stop operation. The smart apparatus is configured for: calculating the total moving distance moved by the wearable apparatus during a period from the start operation to the stop operation according to the coordinates and calculating the average speed of the wearable apparatus during the period according to the total moving distance; and connecting the coordinates to generate the second spatial pattern.

In an embodiment of the invention, the smart apparatus is configured for: scaling the first spatial pattern into a third spatial pattern and mapping the third spatial pattern to a two-dimensional space; mapping the second spatial pattern to the two-dimensional space and aligning the second spatial pattern and the third spatial pattern in the two-dimensional space; creating a plurality of reference lines in the two-dimensional space; locating a plurality of first reference points on the reference lines intersecting the second spatial pattern and locating a plurality of second reference points on the reference lines intersecting the third spatial pattern; respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer; calculating a distance between a j-th first reference point and a j-th second reference point, wherein j is an integer not greater than a third number, and the third number is a smaller one among the first number and the second number; and calculating the similarity according to the distance and an area of the third spatial pattern.

In an embodiment of the invention, the smart apparatus is configured for: calculating a ratio between a first area of the first spatial pattern and a second area of the second spatial pattern, wherein the ratio is greater than 1; scaling up the first spatial pattern into the third spatial pattern according to the ratio; mapping the third spatial pattern to the two-dimensional space and setting a center of mass of the third spatial pattern as an origin point of the two-dimensional space; mapping the second spatial pattern to the two-dimensional space and moving the second spatial pattern so a center of mass thereof is located at the origin point; and rotating the second spatial pattern to maximize an overlapping area between the second spatial pattern and the third spatial pattern.

In an embodiment of the invention, the smart apparatus is further configured for: calculating a complexity for completing the second spatial pattern according to the moving parameters of the wearable apparatus and a difficulty of the first spatial pattern.

In an embodiment of the invention, the first spatial pattern is a two-dimensional pattern having at least one vertex and at least one region. The moving parameters include a height difference and a total moving distance experienced by the wearable apparatus when drawing the second spatial pattern, and the smart apparatus is configured for: calculating a height difference grade based on the height difference and the total moving distance; calculating a number of steps for connecting the at least one vertex in one single stroke based on a number of the at least one vertex and a number of the at least one region and deducing the difficulty of the first spatial pattern according to the number of steps; and calculating the complexity by summing the height difference grade and the difficulty.

In an embodiment of the invention, the smart apparatus is further configured for: correcting the grade by adding the complexity multiplied by a weight to the grade.

In an embodiment of the invention, the moving parameters include a total moving distance and an average speed, and the smart apparatus is configured for: calculating the grade by summing the total moving distance multiplied by a first weight, the average speed multiplied by a second weight and the similarity multiplied by a third weight.

Based on the above, the method for grading spatial painting, the apparatus and the system for grading spatial painting as proposed by the invention allow the user to use the electronic apparatus (e.g., the electronic apparatus and the wearable apparatus) as the point for drawing the second spatial pattern in the space according to the given first spatial pattern and grading by comparing the first and the second spatial patterns. As a result, the invention may utilize novelty of spatial painting to help the user in participating exercise at any time, so as to enhance physical fitness of the user while reducing the time spent on playing with the cell phone. Further, the invention also allows people to train the imagination for the spatial pattern while using the electronic apparatus to draw the second spatial pattern.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is a schematic diagram illustrating the grades corresponding to the second spatial patterns drawn on basis of various exercise modes according to an embodiment of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
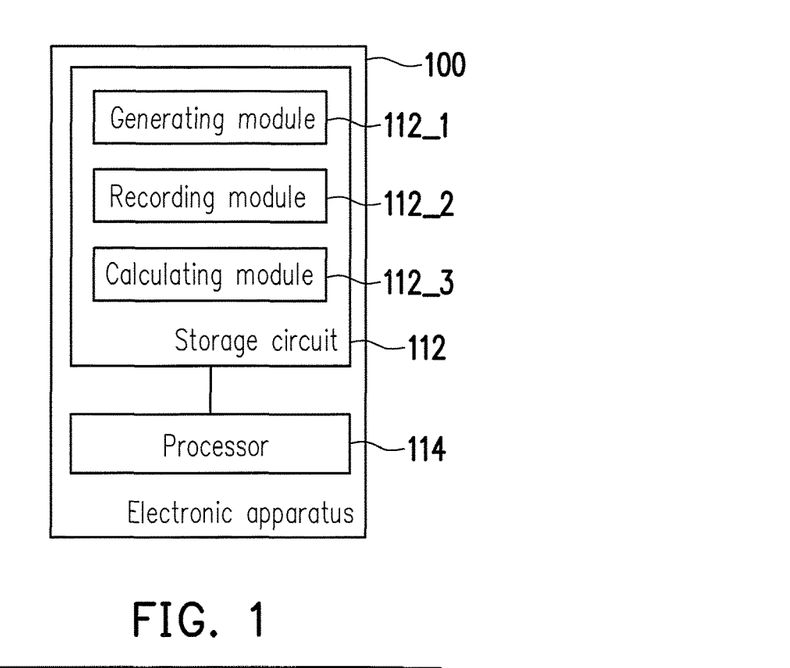
FIG. 1 is a schematic diagram illustrating an electronic apparatus according to an embodiment of the invention.

FIG. 1 is a schematic diagram illustrating an electronic apparatus according to an embodiment of the invention. In the present embodiment, an electronic apparatus 100 is, for example, a cell phone, a smart phone, a wearable apparatus, a personal computer (PC), a notebook PC, a netbook PC, a tablet PC, a game console, a portable apparatus, or a portable multimedia player, but the invention is not limited thereto.

The electronic apparatus 100 may include a storage circuit 112 and a processor 114. The storing unit 112 is, for example, a memory, a hard disk or other devices capable of storing data and recording a plurality of modules. The processor 114 is coupled to the storage circuit 112. The processor 114 can be a processor for general purposes, a processor for special purposes, a conventional processor, a data signal processor, a plurality of microprocessors, one or more microprocessors which are combined to a core of the digital signal processor, controllers, microcontrollers and Application Specific Integrated Circuit (ASIC), a Field Programmable Gate Array (FPGA), any other integrated circuits, a state machine, a processor based on Advanced RISC Machine (ARM) and similar products.

In the present embodiment, after generating a first spatial pattern and informing the user of the same through a user interface such as a touch screen, the electronic apparatus 100 may serve as a point for the user to wave with or carry and move with, so as to draw a second spatial pattern in a three-dimensional space. Next, the electronic apparatus 100 may calculate a grade for completing the second spatial pattern according to a similarity between the first spatial pattern and the second spatial pattern, a complexity for completing the second spatial pattern and various moving parameters of the electronic apparatus 100 when drawing the second spatial pattern. Detailed description will be described more specifically below.

In an embodiment, the processor 114 may access and execute a generating module 112_1, a recording module 112_2 and a calculating module 112_3 in the storage circuit 112 to perform a method for grading spatial painting as proposed in the invention.

Figure 2:
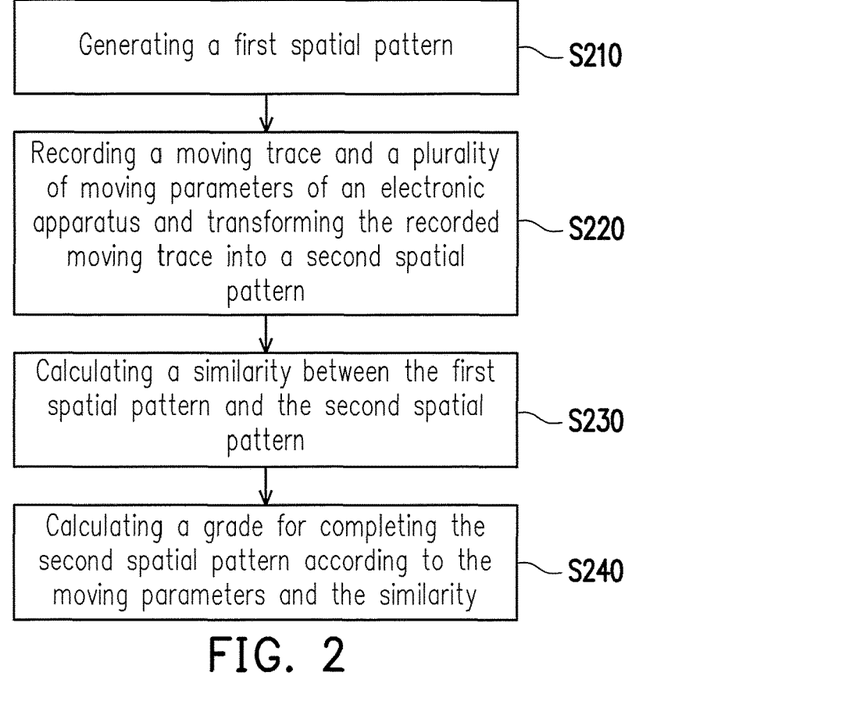
FIG. 2 is a flowchart illustrating a method for grading spatial painting according to an embodiment of the invention.

FIG. 2 is a flowchart illustrating a method for grading spatial painting according to an embodiment of the invention. The method of the present embodiment may be performed by the electronic apparatus 100 in FIG. 1, and each step of the method is described in detail with reference to elements in FIG. 1.

In step S210, the generating module 112_1 may generate a first spatial pattern.

In an embodiment, the first spatial pattern is, for example, a two-dimensional pattern having a plurality of vertices (with the number represented by V) and a plurality of regions (with the number represented by Ar), and the generating module 112_1 may generate said two-dimensional pattern according to the Euler's theorem and an one single stroke principle.

Figure 3A:
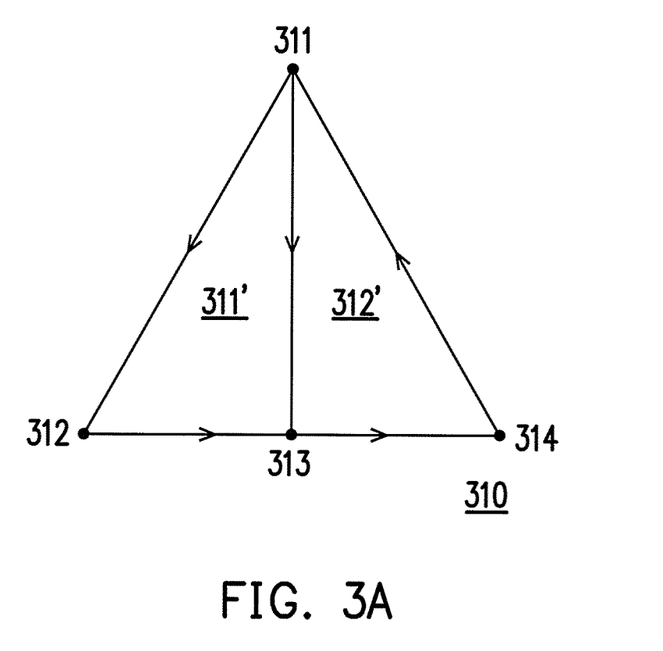
FIG. 3A is a schematic diagram illustrating the first spatial pattern according to an embodiment of the invention.

Referring to FIG. 3A, FIG. 3A is a schematic diagram illustrating a first spatial pattern according to an embodiment of the invention. In the present embodiment, a first spatial pattern 310 is, for example, a two-dimensional pattern including 4 vertices 311 to 314 (i.e., V is 4) and 2 regions 311' to 312' (i.e., Ar is 2). Based on the Euler's theorem and the one single stroke principle, a number of steps (represented by B) for completing the first spatial pattern 310 may be calculated according to a formula "V+Ar−B=1" to be 5 (i.e., it takes 5 steps to connect the vertices 311 to 314 together). The 5 steps are, for example, steps for sequentially passing through the vertices 311 to 314 and 313, as shown by an arrow in FIG. 3A, but the embodiment of the invention is not limited thereto.

Figure 3B:
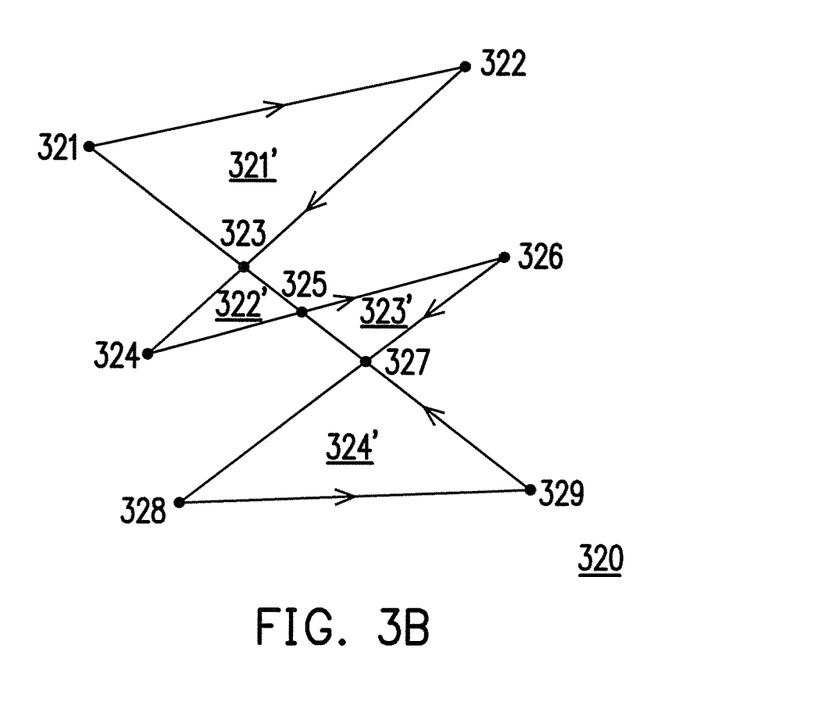
FIG. 3B is a schematic diagram illustrating the first spatial pattern according to another embodiment of the invention.

Referring to FIG. 3B, FIG. 3B is a schematic diagram illustrating a first spatial pattern according to another embodiment of the invention. In the present embodiment, a first spatial pattern 320 is, for example, a two-dimensional pattern including 9 vertices 321 to 329 (i.e., V is 9) and 4 regions 321' to 324' (i.e., Ar is 4). Based on the Euler's theorem and the one single stroke principle, a number of steps for completing the first spatial pattern 320 may also be calculated according to "V+Ar−B=1" to be 12 (i.e., it takes 12 steps to connect the vertices 321 to 329 together). The 12 steps are, for example, steps for sequentially passing through the vertices 321 to 329 and 321, as shown by an arrow in FIG. 3B, but the embodiment of the invention is not limited thereto.

In an embodiment, a difficulty of the first spatial pattern may be defined according to a value of B. For instance, the first spatial pattern with B less than 10 may be defined as a difficulty 1; the first spatial pattern with B between 10 and 20 may be defined as a difficulty 2; the first spatial pattern with B between 20 and 30 may be defined as a difficulty 3; the first spatial pattern with B greater than 30 may be defined as a difficulty 4, but the embodiment of the invention is not limited thereto. In addition, if the first spatial pattern is a non-enclosed pattern, a start point and an end point of the first spatial pattern may be connected in order to calculate B.

In other embodiments, based on demands of the designer, the generating module 112_1 may also design the first spatial pattern to be other forms, such as various geometric patterns, curves, fold lines or a combination thereof.

Next, in step S220, the recording module 112_2 may record a moving trace and a plurality of moving parameters of the electronic apparatus 100 and transforms the recorded moving trace into a second spatial pattern. The moving parameters include, for example, a total moving distance and an average speed of the electronic apparatus 100 during the process of drawing the second spatial pattern, but the invention is not limited thereto. In an embodiment, the recording module 112_2 may start recording a plurality of coordinates of the electronic apparatus 100 in the three-dimensional space based on a sampling period (e.g., 0.001 second) through a gyro, a global positioning system (GPS) or other similar positioning apparatuses in response to a start operation, wherein the coordinates form the moving trace. The start operation may be triggered by the user by performing a specific operation (e.g., pressing down one specific physical/virtual button or entering one specific gesture) on the electronic apparatus 100, for example. Later, the recording module 112_2 may stop recording the coordinates of the electronic apparatus 100 in the three-dimensional space in response to a stop operation. As similar to the start operation, the stop operation may also be triggered by the user by performing a specific operation (e.g., pressing down one specific physical/virtual button or entering one specific gesture) on the electronic apparatus 100.

Thereafter, the recording module 112_2 may calculate the total moving distance moved by the electronic apparatus 100 during a period from the start operation to the stop operation according to the coordinates and calculate the average speed (represented by VA) of the electronic apparatus during the period according to the total moving distance. Further, the recording module 112_2 may connect the coordinates to generate the second spatial pattern.

In brief, the recording module 112_2 may start recording the moving trace of the electronic apparatus 100 after the start operation is triggered by the user and map the recorded moving trace into the second spatial pattern after the stop operation is triggered by the user.

In a different embodiment, the user may draw the second spatial pattern in short range by waving with the electronic apparatus 100 in a smaller space (e.g., a space less than 2 $m^3$), and may also draw the second spatial pattern in wide range by carrying and moving with the electronic apparatus 100 (e.g., while walking, running or taking a transportation vehicle) in a larger space (e.g., a space greater than 2 $m^3$).

Figure 4A:
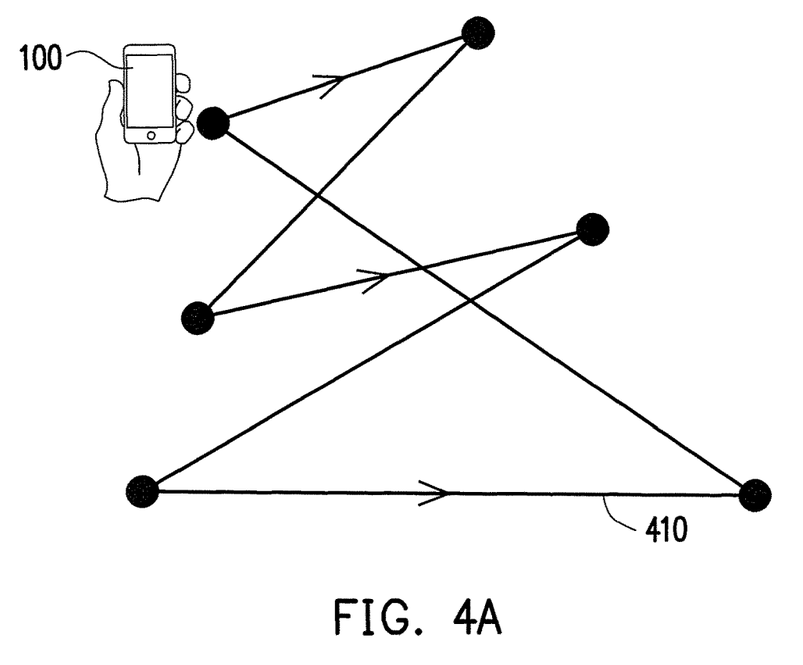
FIG. 4A is a schematic diagram for drawing the second spatial pattern in short range according to the embodiment of FIG. 3B.
Figure 4B:
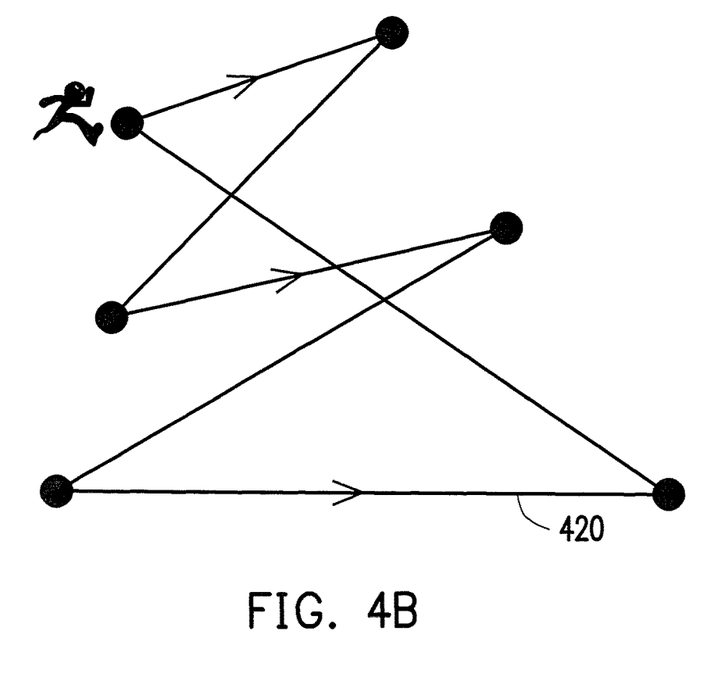
FIG. 4B is a schematic diagram for drawing the second spatial pattern in wide range according to the embodiment of FIG. 3B.

Referring to FIG. 4A, FIG. 4A is a schematic diagram for drawing the second spatial pattern in short range according to the embodiment of FIG. 3B. In the present embodiment, by holding and waving the electronic apparatus 100, the user may draw a second spatial 410 in the three-dimensional space according to the first spatial pattern 320 in FIG. 3B. Referring to FIG. 4B, FIG. 4B is a schematic diagram for drawing the second spatial pattern in wide range according to in the embodiment of FIG. 3B. In the present embodiment, by carrying and moving with the electronic apparatus 100 (e.g., while walking, running or taking a transportation vehicle), the user may draw a second spatial 420 in wide range according to the first spatial pattern 320 in FIG. 3B. It should be noted that, although the second spatial patterns 410 and 420 seem to have similar sizes in the drawing, a size of the second spatial pattern 420 may actually be tens or hundreds times of a size of the second spatial pattern 410.

Thereafter, in step S230, the calculating module 112_3 may calculate a similarity between the first spatial pattern and the second spatial pattern. In an embodiment, the calculating module 112_3 may scale the first spatial pattern into a third spatial pattern and map the third spatial pattern to a two-dimensional space. Next, the calculating module 112_3 may map the second spatial pattern to the two-dimensional space and align the second spatial pattern and the third spatial pattern in the two-dimensional space.

Specifically, the calculating module 112_3 may calculate a ratio between a first area of the first spatial pattern and a second area of the second spatial pattern, wherein the ratio is greater than 1; scale up the first spatial pattern into the third spatial pattern according to the ratio; map the third spatial pattern to the two-dimensional space and set a center of mass of the third spatial pattern as an origin point of the two-dimensional space; map the second spatial pattern to the two-dimensional space and move the second spatial pattern so a center of mass thereof is located at the origin point; and rotate the second spatial pattern to maximize an overlapping area between the second spatial pattern and the third spatial pattern.

Figure 5:
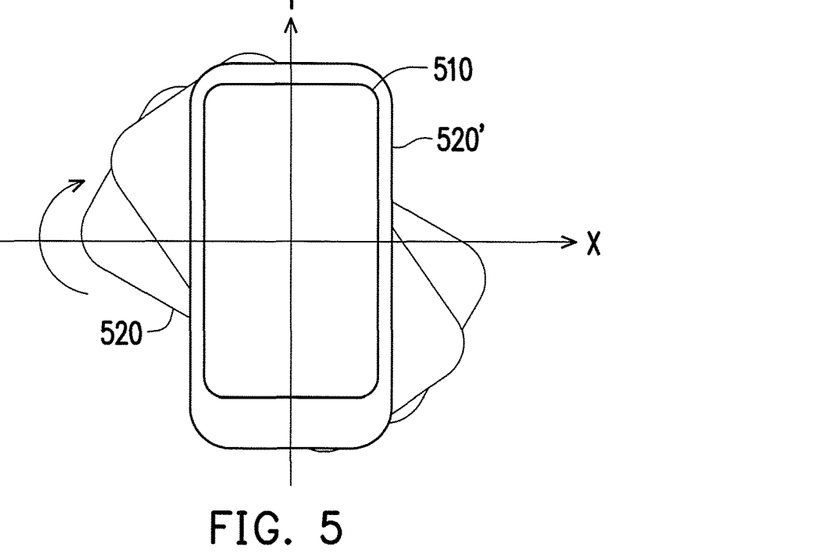
FIG. 5 illustrates a schematic diagram for mapping the second spatial pattern and the third spatial pattern to the same two-dimensional space according to an embodiment of the invention.

Referring to FIG. 5, FIG. 5 illustrates a schematic diagram for mapping the second spatial pattern and the third spatial pattern to the same two-dimensional space according to an embodiment of the invention. In the present embodiment, a third spatial pattern 510 is, for example, the first spatial pattern scaled up according to the ratio. After calculating a center of mass of the third spatial pattern 510, the calculating module 112_3 may set the center of mass of the third spatial pattern 510 as an origin point of a two-dimensional space in FIG. 5. Next, the calculating module 112_3 may map a second spatial pattern 520 to the two-dimensional space in FIG. 5 and move the second spatial pattern 520 so a center of mass thereof is located at the origin point. Next, the calculating module 112_3 may rotate the second spatial pattern 520 to maximize an overlapping area between the second spatial pattern 520 and the third spatial pattern 510. The rotated second spatial pattern 520 is, for example, a second spatial pattern 520', which has the maximal overlapping area with the third spatial pattern 510. In the present embodiment, after the second spatial pattern 520' having the maximal overlapping area with respect to the third spatial pattern 510 is located, the second spatial pattern is then positioned in the two-dimensional space.

After mapping the second and the third spatial patterns to the same two-dimensional space and aligning the two spatial patterns in the two-dimensional space, the calculating module 112_3 may calculate a similarity between the first spatial pattern and the second spatial pattern according to a specific mechanism and details thereof are provided as follows.

Figure 6:
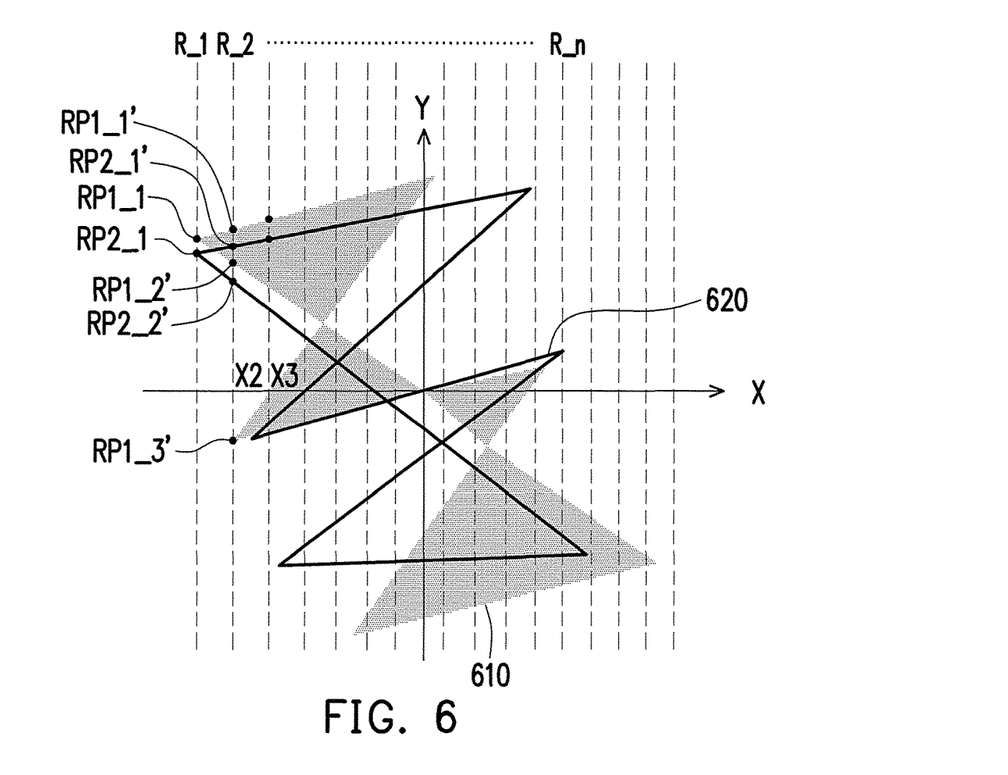
FIG. 6 is a schematic diagram illustrating a mechanism for calculating the similarity according to an embodiment of the invention.

Referring to FIG. 6, FIG. 6 is a schematic diagram illustrating a mechanism for calculating the similarity according to an embodiment of the invention. In the present embodiment, a second spatial pattern 610 and a third spatial pattern 620 are already aligned in a two-dimensional space in FIG. 6. Next, the calculating module 112_3 may create a plurality of reference lines R_1 to R_n (n is a positive integer) in the two-dimensional space in FIG. 6. In the present embodiment, the reference lines R1 to R_n may be, for example, parallel to the Y-axis in FIG. 6, but the embodiment of the invention is not limited thereto. In other embodiments, the calculating module 112_3 may also set the reference lines to be parallel to the X-axis in FIG. 6, or the reference lines may be set as any form based on demands of the designer.

Next, the calculating module 112_3 may locate a plurality of first reference points on the reference lines R_1 to R_n intersecting the second spatial pattern 610 and locate a plurality of second reference points on the reference lines R_1 to R_n intersecting the third spatial pattern 620. For instance, the calculating module 112_3 may locate an i-th reference line (represented by a reference line R_i) from among the reference lines R_1 to n. Accordingly, the calculating module 112_3 may locate the first reference points on the reference line R_i intersecting the second spatial pattern 610, and locate the second reference points on the reference line R_i intersecting the third spatial pattern 620, wherein i is a positive integer. Taking the reference line R_1 for example, the calculating module 112_3 may locate a first reference point RP1_1 intersecting the second spatial pattern 610, and locate a second reference point RP2_1 intersecting the third spatial pattern 620. Now, taking the reference line R_2 for example, the calculating module 112_3 may locate first reference points RP1_1' to RP1_3' intersecting the second spatial pattern 610, and locate second reference points RP2_1' to RP2_2' intersecting the third spatial pattern 620.

Then, the calculating module 112_3 may respectively sort the first reference points and the second reference points corresponding to the reference line R_i, wherein a number of the first reference points corresponding to the reference line R_i is a first number, and a number of the second reference points corresponding to the reference line R_i is a second number. Further, with respect to the reference line R_i, the calculating module 112_3 may calculate a distance between a j-th first reference point and a j-th second reference point, wherein j is an integer not greater than a third number, and the third number is a smaller one among the first number and the second number.

Taking the reference line R_2 (i.e., i is equal to 2) for example, it corresponds to 3 (i.e., the first number) first reference points RP1_1' to RP1_3' and 2 (i.e., the second number) second reference points RP2_1' to RP2_2'. In this example, since the second number is less than the first number, the third number is 2 (i.e., the second number). Next, the calculating module 112_3 may respectively sort the first reference points RP1_1 to RP1_3' and the second reference points RP2_1' to RP2_2'. In an embodiment, the calculating module 112_3 may sort the first reference points RP1_1' to RP1_3' and the second reference points RP2_1' to RP2_2' in descending order according to Y coordinates of the first reference points RP1_1' to RP1_3' and the second reference points RP2_1' to RP2_2' in the two-dimensional space. Then, the calculating module 112_3 may calculate a distance between a first reference point RP1_j' and a second reference point RP2_j', wherein j is between 1 and 2 (i.e., the third number). Aforesaid distance is, for example, the Euclidean distance, but the embodiment of the invention is not limited thereto. In an embodiment, if the Y coordinate of the first reference point RP1_j' is Aj and the Y coordinate of the first reference point RP2_j' is Bj, the distance may be expressed as "$d_i|_{i=2} = \sqrt{\Sigma_j^2=1(A_j-B_j)^2}$".

Based on the above teachings, a general formula of the distance corresponding to the reference line R_i may be deduced by analogy (i.e., "$d_i = \sqrt{\Sigma(A_j-B_j)^2}$"). Next, the calculating module 112_3 may calculate the similarity according to the distance and an area (represented by S3) of the third spatial pattern. Specifically, the calculating module 112_3 may calculate distances $d_1$ to $d_n$ respectively corresponding to the reference lines R_1 to R_n, and an average value of the distances $d_1$ to $d_n$ is "$d=(d_1+ \ldots +d_n)/n$". Then, the calculating module 112_3 may calculate that the similarity (represented by Sim) is "$Sim=1-d/\sqrt{S3}$", but the embodiment of the invention is not limited thereto.

In an embodiment, the calculating module 112_3 may calculate the complexity for completing the second spatial pattern according to the moving parameters of the electronic apparatus 100 and the difficulty of the first spatial pattern. In the present embodiment, the moving parameters include a height difference and a total moving distance experienced by the electronic apparatus 100 when drawing the second spatial pattern. In this case, the calculating module 112_3 may calculate a height difference grade (represented by H) based on the height difference (represented by HD) and the total moving distance (represented by S). In an embodiment, H may be expressed as "$H=1\pm(HD/S)$", but the invention is not limited thereto. Next, the calculating module 112_3 may calculate a number of steps for connecting said multiple vertices in one single stroke based on the Euler's theorems, the number of the vertices and the number of regions and deduce the difficulty of the first spatial pattern according to the number of steps. The method used by the calculating module 112_3 for deducing the difficulty of the first spatial pattern may refer to the description in the foregoing embodiment, which is not repeated hereinafter. Then, the calculating module 112_3 may calculate the complexity (represented by C) by summing the height difference grade and the difficulty (i.e., "C=X+H").

In step S240, the calculating module 112_3 may calculate the grade for completing the second spatial pattern according to the moving parameters and the similarity. In an embodiment, the calculating module 112_3 may calculate the grade (represented by G) by summing the total moving distance multiplied by a first weight (represented by k1), the average speed multiplied by a second weight (represented by k2) and the similarity multiplied by a third weight (represented by k3) (i.e., "$G=k1\times\sqrt{S}+k2\times\sqrt{VA-2000}+k3\times Sim$"). In an embodiment, the calculating module 112_3 may further correct the grade according to aforesaid complexity. Specifically, the calculating module 112_3 may calculate a corrected grade (represented by G') by adding the complexity multiplied by a weight (represented by k4) to the grade (i.e., "G'=G+k4×C").

Because body movement is required when the user draws the second spatial pattern by waving with the electronic apparatus 100 or carrying and moving with the electronic apparatus 100, the effectiveness of exercising may be achieved, Further, the user also needs to picture the moving trace of the second spatial pattern in mind so the effectiveness of training imagination of the spatial pattern may also be achieved. In addition, in other embodiments, the electronic apparatus 100 may also upload the obtained grade to the social network of the user for sharing with other friends, so as to increase users' interest and motivation for exercise.

In different embodiments, k1, k2, k3 and k4 may be set based on demands of the designer. In an embodiment, since the difference between values of S, VA, Sim and C may be considerably big, k1, k2, k3 and k4 may be designed to allow said values to be more even after each of the values is multiplied by the respective weight.

Referring FIG. 7, FIG. 7 is a schematic diagram illustrating the grades corresponding to the second spatial patterns drawn on basis of various exercise modes according to an embodiment of the invention. In the present embodiment, k1, k2, k3 and k4 may be set as 1, 0.55, 100 and 50 respectively, but the embodiment of the invention is not limited thereto. In an exercise mode of "Best result in 100 m running", it is assumed that the user attempts to complete drawing of the second spatial pattern with the fastest speed for completing 100 m running in world record, and the corresponding grade is "204.7446384". Further, in an exercise mode of "Best result in Marathon running", it is assumed that the user attempts to complete drawing of the second spatial pattern with the fastest speed for completing Marathon running in world record, and the corresponding grade is "367.0201644". In an exercise mode of "Ordinary people in 100 m running", it is assumed that the user attempts to complete drawing of the second spatial pattern with the average speed of ordinary people for completing 100 m running, and the corresponding grade is "195.5163576". In an exercise mode of "Ordinary people in Marathon running", it is assumed that the user attempts to complete drawing of the second spatial pattern with the average speed of ordinary people for completing Marathon running, and the corresponding grade is "348.5917971". In an exercise mode of "2 km walking", it is assumed that the user attempts to complete drawing of the second spatial pattern with the average speed for completing 2 km walking, and the corresponding grade is "135.7213595". In an exercise mode of "4 km fast walking", it is assumed that the user attempts to complete drawing of the second spatial pattern with the average speed for completing 4 km fast walking, and the corresponding grade is "184.3702939".

Furthermore, among the exercise modes of a spatial difficulty 1 to a spatial difficulty 4, except the difficulties of the first spatial pattern (which are X=1 to X=4, respectively) being different, the rest of the parameters are identical. In view of the spatial difficulty 1 to the spatial difficulty 4, it can be known that, when the difficulty of the first spatial pattern is higher, the corresponding grade is also higher. The method for drawing the second spatial pattern by the user and the grade thereof corresponding to the rest of the exercise modes may be deduced by analogy according aforesaid teachings, which are not repeated hereinafter.

Figure 8:
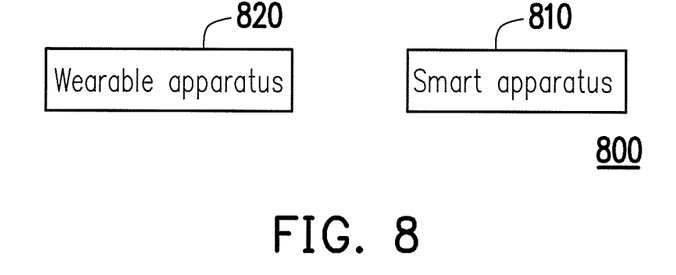
FIG. 8 is a schematic diagram illustrating a system for grading spatial painting according to an embodiment of the invention.

Referring to FIG. 8, FIG. 8 is a schematic diagram illustrating a system for grading spatial painting according to an embodiment of the invention. In the present embodiment, a system 800 includes a smart apparatus 810 and a wearable apparatus 820. The smart apparatus 810 is, for example, a cell phone, a smart phone, a personal computer, a notebook computer, a netbook computer, a tablet computer, a game console, a portable apparatus, or a portable multimedia player, but the invention is not limited thereto. The wearable apparatus 820 is, for example, a smart bracelet, a smart footwear, a smart glasses, or other apparatuses wearable by the user and capable of conducting data exchange with the smart apparatus 810 through a near field communication protocol (e.g., Bluetooth) or a wireless communication. In the present embodiment, the smart apparatus 810 and the wearable apparatus 820 may cooperate to complete the method for grading spatial painting performed by the electronic apparatus 100 of FIG. 1.

Specifically, the smart apparatus 810 may generate a first spatial pattern. After that, the wearable apparatus 820 worn by the user may record its own moving trace and moving parameters, and transmits the moving trace and the moving parameters back to the smart apparatus 810. Taking FIG. 4A for example, the user who wears the wearable apparatus 820 may draw a second spatial pattern by waving with the wearable apparatus 820 in the three-dimensional space, as shown by FIG. 4A. Alternatively, the user who wears the wearable apparatus 820 may also draw the second spatial pattern by moving in wide range, as shown in FIG. 4B.

Next, the smart apparatus 810 transforms the moving trace recorded by the wearable apparatus 820 into the second spatial pattern, calculates a similarity between the first spatial pattern and the second spatial pattern, calculates a complexity for completing the second spatial pattern according to the moving parameters of the wearable apparatus 820 and a difficulty of the first spatial pattern, and calculate a grade for completing the second spatial pattern according to the moving parameters, the similarity and the complexity. Details regarding aforesaid operations may refer to the description for each step in FIG. 2, which is not repeated hereinafter.

In summary, the method for grading spatial painting, the apparatus and the system for grading spatial painting as proposed by the invention allow the user to use the electronic apparatus or the wearable apparatus as the point for drawing the second spatial pattern in the space according to the given first spatial pattern and performing the grading by comparing the first and the second spatial patterns. Accordingly, in addition to the effectiveness of exercising, the invention is also capable of allowing the user to train the imagination for the space pattern and increase users' interest and motivation for exercise.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for grading spatial painting, adapted to an electronic apparatus, and comprising:
   generating a first spatial pattern;
   recording a moving trace and a plurality of moving parameters of the electronic apparatus and transforming the recorded moving trace into a second spatial pattern, wherein the moving parameters comprise a total moving distance and an average speed;
   calculating a similarity between the first spatial pattern and the second spatial pattern;
   calculating a complexity for completing the second spatial pattern according to the moving parameters of the electronic apparatus and a difficulty of the first spatial pattern; and
   calculating a grade for completing the second spatial pattern according to the moving parameters and the similarity.

2. The method according to claim 1, wherein the step of recording the moving trace and the moving parameters of the electronic apparatus and transforming the recorded moving trace into the second spatial pattern comprises:
   starting recording a plurality of coordinates of the electronic apparatus based on a sampling period in response to a start operation, wherein the coordinates form the motiving trace;
   stopping recording the coordinates of the electronic apparatus in response to a stop operation;
   calculating the total moving distance moved by the electronic apparatus during a period from the start operation to the stop operation according to the coordinates and calculating the average speed of the electronic apparatus during the period according to the total moving distance; and
   connecting the coordinates to generate the second spatial pattern.

3. The method according to claim 1, wherein the step of calculating the similarity between the first spatial pattern and the second spatial pattern comprises:
   scaling the first spatial pattern into a third spatial pattern and mapping the third spatial pattern to a two-dimensional space;
   mapping the second spatial pattern to the two-dimensional space and aligning the second spatial pattern and the third spatial pattern in the two-dimensional space;
   creating a plurality of reference lines in the two-dimensional space;
   locating a plurality of first reference points on the reference lines intersecting the second spatial pattern and locating a plurality of second reference points on the reference lines intersecting the third spatial pattern;
   respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer;
   calculating a distance between a j-th first reference point and a j-th second reference point, wherein j is an integer not greater than a third number, and the third number is a smaller one among the first number and the second number; and calculating the similarity according to the distance and an area of the third spatial pattern.

4. The method according to claim 3, wherein the step of scaling the first spatial pattern into the third spatial pattern and mapping the third spatial pattern to the two-dimensional space comprises:

calculating a ratio between a first area of the first spatial pattern and a second area of the second spatial pattern, wherein the ratio is greater than 1;

scaling up the first spatial pattern into the third spatial pattern according to the ratio;

mapping the third spatial pattern to the two-dimensional space and setting a center of mass of the third spatial pattern as an origin point of the two-dimensional space;

wherein the step of mapping the second spatial pattern to the two-dimensional space and aligning the second spatial pattern and the third spatial pattern in the two-dimensional space comprises:

mapping the second spatial pattern to the two-dimensional space and moving the second spatial pattern so a center of mass thereof is located at the origin point; and rotating the second spatial pattern to maximize an overlapping area between the second spatial pattern and the third spatial pattern.

5. The method according to claim 1, wherein the first spatial pattern is a two-dimensional pattern having at least one vertex and at least one region, the moving parameters comprise a height difference and the total moving distance experienced by the electronic apparatus when drawing the second spatial pattern, and the step of calculating the complexity for completing the second spatial pattern according to the moving parameters of the electronic apparatus and the difficulty of the first spatial pattern comprises:

calculating a height difference grade based on the height difference and the total moving distance;

calculating a number of steps for connecting the at least one vertex in one single stroke based on a number of the at least one vertex and a number of the at least one region and deducing the difficulty of the first spatial pattern according to the number of steps; and calculating the complexity by summing the height difference grade and the difficulty.

6. The method according to claim 1, wherein after the step of calculating the grade for completing the second spatial pattern according to the moving parameters and the similarity, the method further comprises: correcting the grade by adding the complexity multiplied by a weight to the grade.

7. The method according to claim 1, wherein the step of calculating the grade for completing the second spatial pattern according to the moving parameters and the similarity comprises:

calculating the grade by summing the total moving distance multiplied by a first weight, the average speed multiplied by a second weight and the similarity multiplied by a third weight.

8. An electronic apparatus for grading spatial painting, comprising:

a storage circuit, storing a plurality of modules; and
a processor, coupled to the storage circuit and configured to access the modules to perform the following steps:
generating a first spatial pattern;
recording a moving trace and a plurality of moving parameters and transforming the recorded moving trace into a second spatial pattern, wherein the moving parameters comprise a total moving distance and an average speed;

calculating a complexity for completing the second spatial pattern according to the moving parameters of the electronic apparatus and a difficulty of the first spatial pattern; and calculating a similarity between the first spatial pattern and the second spatial pattern and calculating a grade for completing the second spatial pattern according to the moving parameters and the similarity.

9. The electronic apparatus according to claim 8, wherein the processor is configured for:

starting recording a plurality of coordinates of the electronic apparatus based on a sampling period in response to a start operation, wherein the coordinates form the motiving trace;

stopping recording the coordinates of the electronic apparatus in response to a stop operation;

calculating the total moving distance moved by the electronic apparatus during a period from the start operation to the stop operation according to the coordinates and calculating the average speed of the electronic apparatus during the period according to the total moving distance; and connecting the coordinates to generate the second spatial pattern.

10. The electronic apparatus according to claim 8, wherein the processor is configured for:

scaling the first spatial pattern into a third spatial pattern and mapping the third spatial pattern to a two-dimensional space;

mapping the second spatial pattern to the two-dimensional space and aligning the second spatial pattern and the third spatial pattern in the two-dimensional space;

creating a plurality of reference lines in the two-dimensional space;

locating a plurality of first reference points on the reference lines intersecting the second spatial pattern and locating a plurality of second reference points on the reference lines intersecting the third spatial pattern;

respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer;

calculating a distance between a j-th first reference point and a j-th second reference point, wherein j is an integer not greater than a third number, and the third number is a smaller one among the first number and the second number; and calculating the similarity according to the distance and an area of the third spatial pattern.

11. The electronic apparatus according to claim 10, wherein the processor is configured for:

calculating a ratio between a first area of the first spatial pattern and a second area of the second spatial pattern, wherein the ratio is greater than 1;

scaling up the first spatial pattern into the third spatial pattern according to the ratio;

mapping the third spatial pattern to the two-dimensional space and setting a center of mass of the third spatial pattern as an origin point of the two-dimensional space;

mapping the second spatial pattern to the two-dimensional space and moving the second spatial pattern so a center of mass thereof is located at the origin point; and rotating the second spatial pattern to maximize an overlapping area between the second spatial pattern and the third spatial pattern.

12. The electronic apparatus according to claim 8, wherein the first spatial pattern is a two-dimensional pattern having at least one vertex and at least one region, the moving parameters comprise a height difference and the total moving distance experienced by the electronic apparatus when drawing the second spatial pattern, and the processor is configured for:

calculating a height difference grade based on the height difference and the total moving distance;

calculating a number of steps for connecting the at least one vertex in one single stroke based on a number of the at least one vertex and a number of the at least one region and deducing the difficulty of the first spatial pattern according to the number of steps; and calculating the complexity by summing the height difference grade and the difficulty.

13. The electronic apparatus according to claim 8, wherein the processor is further configured for correcting the grade by adding the complexity multiplied by a weight to the grade.

14. The electronic apparatus according to claim 8, wherein the processor-is configured for:

calculating the grade by summing the total moving distance multiplied by a first weight, the average speed multiplied by a second weight and the similarity multiplied by a third weight.

15. A system for grading spatial painting, comprising:

a smart apparatus, generating a first spatial pattern;

a wearable apparatus, connected to the smart apparatus, and configured for recording a moving trace and a plurality of moving parameters of the wearable apparatus and transmitting the moving trace and the moving parameters back to the smart apparatus, wherein the moving parameters comprise a total moving distance and an average speed, wherein the smart apparatus transforms the moving trace recorded by the wearable apparatus into a second spatial pattern, calculates a complexity for completing the second spatial pattern according to the moving parameters of the wearable apparatus and a difficulty of the first spatial pattern, calculates a similarity between the first spatial pattern and the second spatial pattern, and calculates a grade for completing the second spatial pattern according to the moving parameters and the similarity.

16. The system according to claim 15, wherein the wearable apparatus is configured for:

starting recording a plurality of coordinates of the wearable apparatus based on a sampling period in response to a start operation, wherein the coordinates form the motiving trace;

stopping recording the coordinates of the wearable apparatus in response to a stop operation;

wherein the smart apparatus is configured for:

calculating the total moving distance moved by the wearable apparatus during a period from the start operation to the stop operation according to the coordinates and calculating the average speed of the wearable apparatus during the period according to the total moving distance; and connecting the coordinates to generate the second spatial pattern.

17. The system according to claim 15, wherein the smart apparatus is configured for:

scaling the first spatial pattern into a third spatial pattern and mapping the third spatial pattern to a two-dimensional space;

mapping the second spatial pattern to the two-dimensional space and aligning the second spatial pattern and the third spatial pattern in the two-dimensional space;

creating a plurality of reference lines in the two-dimensional space;

locating a plurality of first reference points on the reference lines intersecting the second spatial pattern and locating a plurality of second reference points on the reference lines intersecting the third spatial pattern;

respectively sorting the first reference points and the second reference points corresponding to an i-th reference line among the reference lines, wherein a number of the first reference points corresponding to the i-th reference line is a first number, and a number of the second reference points corresponding to the i-th reference line is a second number, wherein i is a positive integer;

calculating a distance between a j-th first reference point and a j-th second reference point, wherein j is an integer not greater than a third number, and the third number is a smaller one among the first number and the second number; and calculating the similarity according to the distance and an area of the third spatial pattern.

18. The system according to claim 17, wherein the smart apparatus is configured for:

calculating a ratio between a first area of the first spatial pattern and a second area of the second spatial pattern, wherein the ratio is greater than 1;

scaling up the first spatial pattern into the third spatial pattern according to the ratio;

mapping the third spatial pattern to the two-dimensional space and setting a center of mass of the third spatial pattern as an origin point of the two-dimensional space;

mapping the second spatial pattern to the two-dimensional space and moving the second spatial pattern so a center of mass thereof is located at the origin point; and rotating the second spatial pattern to maximize an overlapping area between the second spatial pattern and the third spatial pattern.

19. The system according to claim 15, wherein the first spatial pattern is a two-dimensional pattern having at least one vertex and at least one region, the moving parameters comprise a height difference and the total moving distance experienced by the wearable apparatus when drawing the second spatial pattern, and the smart apparatus is configured for:

calculating a height difference grade based on the height difference and the total moving distance;

calculating a number of steps for connecting the at least one vertex in one single stroke based on a number of the at least one vertex and a number of the at least one region and deducing the difficulty of the first spatial pattern according to the number of steps; and calculating the complexity by summing the height difference grade and the difficulty.

20. The system according to claim 15, wherein the smart apparatus is further configured for correcting the grade by adding the complexity multiplied by a weight to the grade.

21. The system according to claim 15, wherein the smart apparatus is configured for:
 calculating the grade by summing the total moving distance multiplied by a first weight, the average speed multiplied by a second weight and the similarity multiplied by a third weight.

\* \* \* \* \*